United States Patent
Kuhnert et al.

(10) Patent No.: US 11,209,539 B2
(45) Date of Patent: Dec. 28, 2021

(54) METHOD FOR MAPPING THE ENVIRONMENT OF MOTOR VEHICLES

(71) Applicant: Ford Global Technologies, LLC, Dearborn, MI (US)

(72) Inventors: Lars Kuhnert, Cologne NRW (DE); Nadja Wysietzki, Cologne NRW (DE); Ahmed Benmimoun, Aachen NRW (DE); Martin Klubal, Cologne NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 16/420,293

(22) Filed: May 23, 2019

(65) Prior Publication Data

US 2019/0361112 A1     Nov. 28, 2019

(30) Foreign Application Priority Data

May 24, 2018   (DE) .......................... 102018208205.7

(51) Int. Cl.
| | | |
|---|---|---|
| *G01S 13/89* | (2006.01) | |
| *G01S 13/931* | (2020.01) | |
| *G05D 1/02* | (2020.01) | |
| *G06K 9/00* | (2006.01) | |
| *G01S 13/00* | (2006.01) | |

(52) U.S. Cl.
CPC ............ *G01S 13/89* (2013.01); *G01S 13/931* (2013.01); *G05D 1/0238* (2013.01); *G06K 9/00805* (2013.01)

(58) Field of Classification Search
CPC ...................................................... G06T 17/10
See application file for complete search history.

(56) References Cited

U.S. PATENT DOCUMENTS

| | | | | |
|---|---|---|---|---|
| 5,781,437 A | * | 7/1998 | Wiemer | G01C 21/3688 340/995.26 |
| 6,212,471 B1 | * | 4/2001 | Stiles | G01S 13/88 342/158 |
| 6,982,667 B2 | * | 1/2006 | Artebrant | G01S 13/723 342/195 |
| 7,002,572 B1 | * | 2/2006 | Teig | G06T 17/00 345/420 |
| 7,054,467 B1 | * | 5/2006 | Honda | G01S 3/784 382/104 |

(Continued)

FOREIGN PATENT DOCUMENTS

| | | | | |
|---|---|---|---|---|
| CN | 101526611 B | 12/2011 | | |
| EP | 3040909 A1 | * 7/2016 | ........... | G01S 13/931 |

OTHER PUBLICATIONS

Michael S. Darms, et al., "Obstacle Detection and Tracking for the Urban Challenge", IEEE Transactions on Intelligent Transportation Systems, vol. 10, No. 3, dated Sep. 2009, pp. 475-485 (11 pages).

*Primary Examiner* — Bernarr E Gregory
(74) *Attorney, Agent, or Firm* — Frank A. MacKenzie; Bejin Bieneman PLC

(57) ABSTRACT

A computer includes a processor and a memory, the memory storing instructions executable by the processor to detect a plurality of objects around a vehicle and develop a map of an environment around the vehicle based on a polygon having sides extending between the plurality of objects, wherein the vehicle is located within an interior of the polygon.

10 Claims, 5 Drawing Sheets

(56) References Cited

U.S. PATENT DOCUMENTS

| | | | |
|---|---|---|---|
| 7,409,323 B1* | 8/2008 | O'Brien, Jr. | G01S 7/295 |
| | | | 434/6 |
| 7,903,024 B2 | 3/2011 | Tietjen et al. | |
| 10,157,498 B2* | 12/2018 | Zou et al. | G06T 17/10 |
| 11,112,249 B1* | 9/2021 | Jakusz | G05D 1/101 |
| 2005/0024492 A1* | 2/2005 | Schaefer | G01S 17/931 |
| | | | 348/135 |
| 2013/0176192 A1 | 7/2013 | Varga et al. | |
| 2015/0120138 A1* | 4/2015 | Zeng | G01S 13/931 |
| | | | 701/41 |
| 2016/0170020 A1* | 6/2016 | Hamada | G01S 13/931 |
| | | | 342/70 |
| 2016/0210775 A1 | 7/2016 | Alaniz et al. | |
| 2017/0206436 A1 | 7/2017 | Schiffmann | |
| 2017/0356994 A1* | 12/2017 | Wodrich | G01S 13/931 |
| 2018/0164421 A1* | 6/2018 | Brown | G01S 13/931 |

* cited by examiner

METHOD FOR MAPPING THE ENVIRONMENT OF MOTOR VEHICLES

CROSS-REFERENCE TO RELATED APPLICATION

This patent application claims priority to and all benefits of Germany Application No. DE 102018208205.7 filed on May 24, 2018, which is hereby incorporated by reference in its entirety.

FIELD OF THE DISCLOSURE

The disclosure relates to a method for mapping the environment of motor vehicles.

BACKGROUND

US 2017/206436 A1 discloses, for example, an object tracking system which is suitable for use in an automated vehicle. Said system comprises a camera, a radar sensor and a controller. The controller is configured in such a manner that it assigns a vision identification to each vision track associated with an instance of an object detected using the camera and assigns a radar identification to each radar object associated with an instance of grouped tracklets detected with the aid of the radar sensor. The controller is also configured to determine probabilities of a vision track and a radar object indicating the same object. If the combination has a reasonable chance of correspondence, it is included in further screening of the data in order to determine a combination of pairings of each vision track to a radar track which has the greatest possibility of being the correct combination.

The present disclosure includes a simpler, fast and nevertheless more reliable method for mapping the environment of motor vehicles, which method can be used by autonomous motor vehicles, in particular, to perceive their environment.

The disclosure identifies that, if those detected objects which should be concealed by a detected unconcealed object closer to the radar sensor are ignored, a large number of false detections can be ignored and the map creation effort therefore falls.

In other words, only those objects which should be able to be actually positively detected by the sensor in its field of view are concomitantly included in the map. Those objects to which the sensor does not have a line of sight, i.e., are concealed by an object closer to the sensor, and for whatever reasons generate a detection signal, are ignored.

In the case of radar sensors in particular, such false detections arise as a result of reflections or ground clutter.

The unconcealed objects determined in this manner are used to create a map which represents the free space around the sensor or the vehicle. For this purpose, a polygon is determined, the corners of which are each in equally spaced circle segments around the motor vehicle with the radar sensor at the center, and each corner represents a detected unconcealed object closest to the radar sensor in the respective circle segment or, in the case of an empty circle segment, a corner at a detection distance, with the result that only detected objects within the polygon are taken into account.

The 360° environment is therefore divided into circle segments and a detected unconcealed object is used as the corner point for the polygon in each circle segment. If an object is not detected in a circle segment, a predefined detection distance (or range) of the sensor is used as a virtual object.

Equally spaced circle segments are preferably used. However, it is also conceivable to divide the circle segments in another manner, for example with a finer division at the front than at the rear in the direction of travel, with the result that more objects are included in the map there.

In order to simplify the map further, in order to smooth the polygon, corners which, when looked at from the radar sensor, are behind a line can be removed, wherein the line corresponds to the Euclidean distance of a pair of corner points if this distance is less than a particular threshold value and all possible pairs of corner points are run through. "Spikes" in the polygon in the case of objects which are closer together can therefore be removed or closed, which results in a reduction in data.

In order to introduce an uncertainty margin in the map, the corner points of the polygon can be shifted. In this case, the polygon is usefully extended. For this purpose, either the corner points in the respective circle segment can be moved by a predetermined extent to the outside in a radial direction or the corner points in the respective circle segment can be moved by a predetermined extent to the outside on the respective normal.

In order to improve the object detection and accelerate the mapping, the detected stationary and unconcealed objects closer to the radar sensor are tracked over time and are included in the determination of the polygon. Therefore, in addition to the objects currently detected by the sensor, virtual detected objects which increase the detection certainty or the detection probability are used in the mapping.

In summary, a polygon is determined as a map of the free space according to the disclosure, in which the corner points comprise unconcealed detected objects which are each in a circle segment in a 360° environment of the vehicle or of the sensor.

Further details of the disclosure emerge from the following description of exemplary embodiments with reference to the drawing, in which:

DETAILED DESCRIPTION

Figure 1:
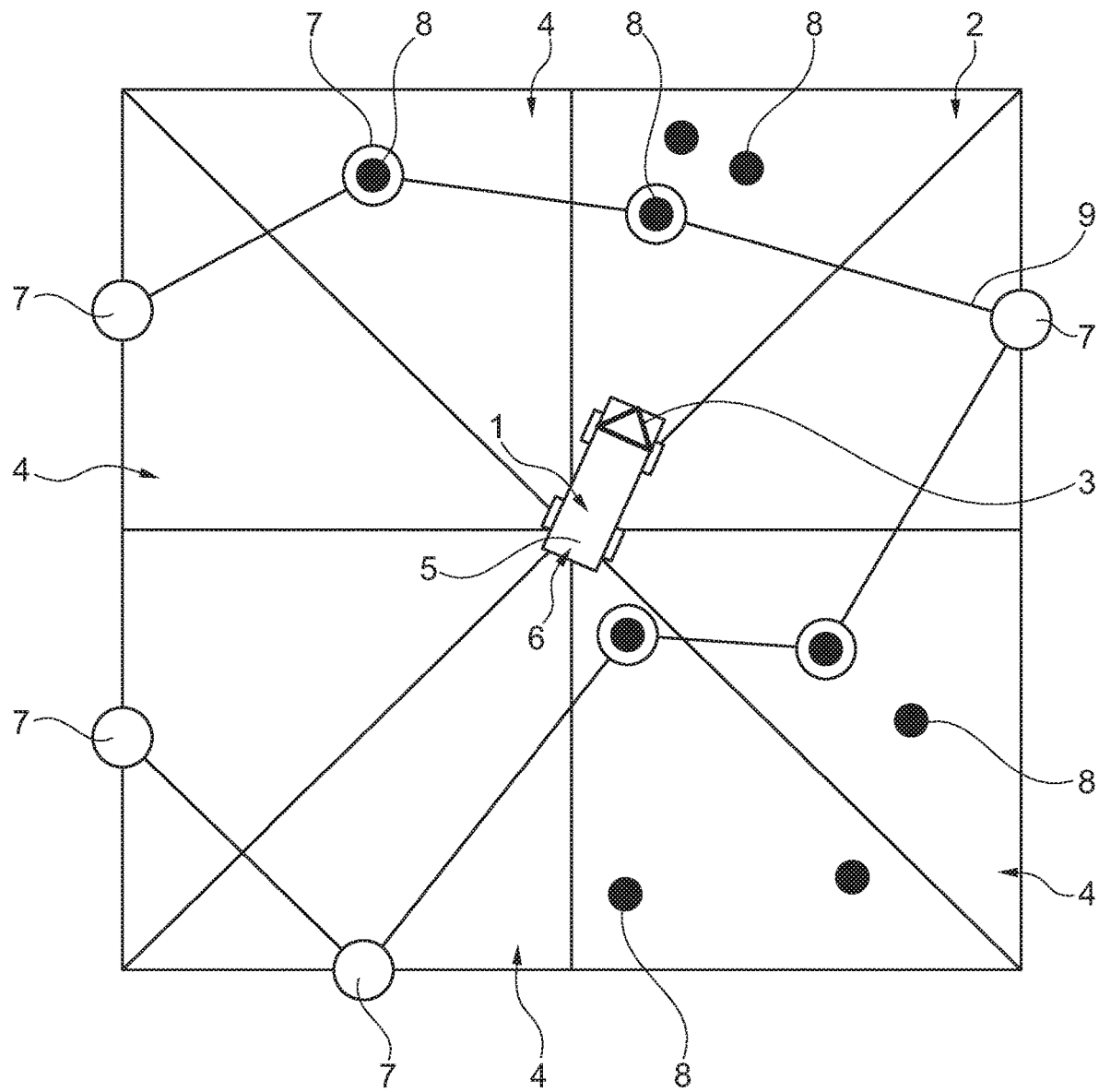
FIG. 1 shows a schematic plan view of a motor vehicle during mapping.

The figures illustrate an autonomous motor vehicle (for example an automobile), which is schematically illustrated and is denoted 1 as a whole, in the middle of its radar sensor field 2, which vehicle is moving in the direction of travel 3.

The 360° sensor field 2 is divided into circle segments 4 starting from the center 5 or sensor 6. In the present case, each of the eight circle segments covers 45°. It goes without saying that this is a simplified illustration and the circle segments can be divided differently.

The figures illustrate detected objects as circles 7, 8. The open circles 7 denoted detected objects which are unconcealed, or, if an object is not detected in a circle segment, the predefined detection distance (or range) of the sensor is used as a virtual object.

Objects which are illustrated as a two-dimensional circle 8 are real objects detected by the radar sensor.

These are simultaneously marked with an open circle 7 if they have been selected for mapping.

The 360° environment is divided into circle segments 4 and a detected unconcealed object 7 is used as a corner point for a polygon 9 in each circle segment 4, for which purpose the corner points or objects 7 are connected by means of lines.

Only those objects 7 which are not concealed are used as corner points. That is to say, those detected objects 8 which are concealed by a detected unconcealed object 7 closer to the radar sensor 6 are ignored.

The polygon 9 is therefore determined in such a manner that its corners (objects 7) are each in equally spaced circle segments 4 around the motor vehicle 1 with the radar sensor 6 at the center 5, and each corner represents a detected unconcealed object 7 closest to the radar sensor in the respective circle segment 4 or, in the case of an empty circle segment, a corner at a detection distance, with the result that only detected objects within the polygon are taken into account.

Figure 2A:
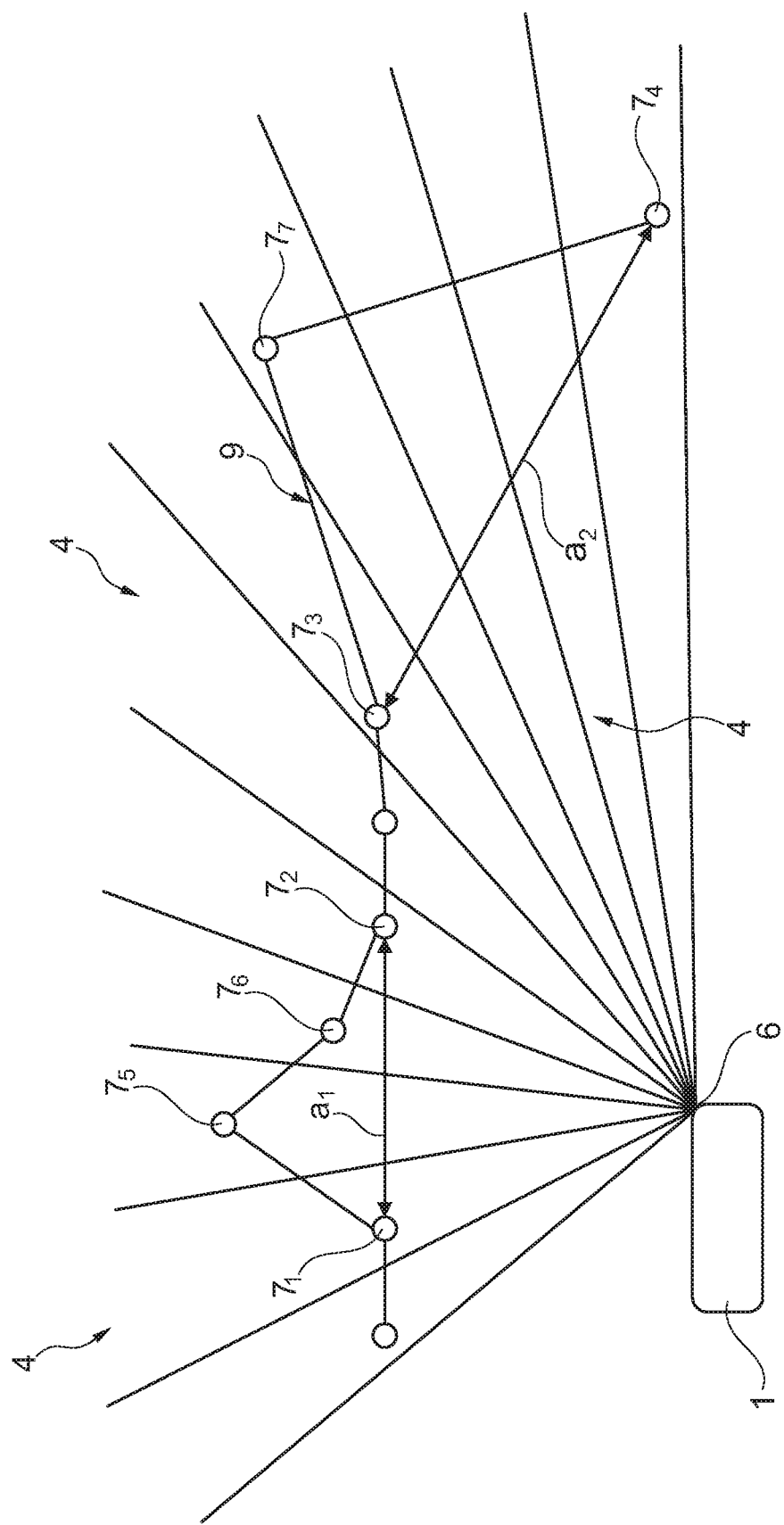
FIGS. 2A, B show a schematic view of the smoothing of the polygon or of the map.

As illustrated using FIGS. 2A and B, particular corners which, when looked at from the radar sensor 6, are behind a line are removed in order to smooth the polygon 9, wherein the line corresponds to the Euclidean distance of a pair of corner points if this distance is less than a particular threshold value and all possible pairs of corner points are run through.

Figure 2B:
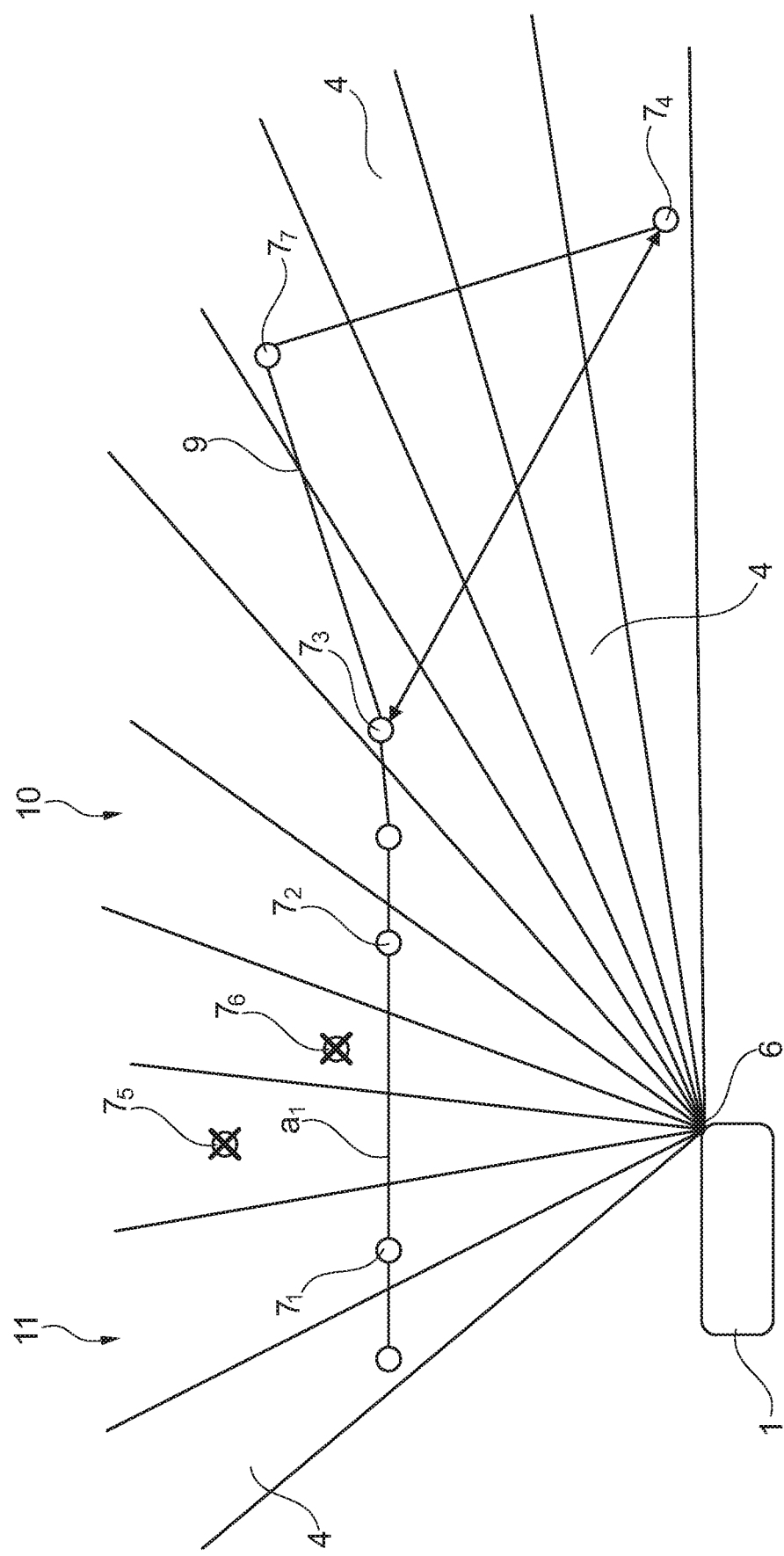

FIGS. 2A and 2B illustrate, by way of example, a section of a 360° sensor field 2 having circle segments 4 and unconcealed objects 7.

The distance between the pairs of corner points $7_1$ and $7_2$ and $7_3$ and $7_4$ is intended to be considered for the purpose of illustration.

The distance a1 between corner points $7_1$ and $7_2$ is less than a specification, with the result that the corner points $7_5$ and $7_6$, which are behind the line $a_1$, are eliminated from the polygon.

Accordingly, the distance $a_2$ between corner points $7_3$ and $7_4$ is greater than a specification, with the result that the corner point $7_7$ is not eliminated from the polygon 9 even though it is behind the line $a_2$.

It is assumed that the sensor 6 has a field of view of less than 180° and the corner points or objects 7 to be removed are between left-hand and right-hand boundary segments 10, 11.

The 360° view is achieved by combining four individual sensors each having an opening angle of approximately 150° to form the actual sensor 6.

The evaluation with respect to the distance of concealed detections is carried out for each individual sensor from the perspective of the respective sensor.

The boundary segments are the segments which are associated with the current pair of polygon points, that is to say arise during the evaluation of all pairs of points.

The result is therefore a profile of the polygon 9 as illustrated in FIG. 2B.

Figure 3:
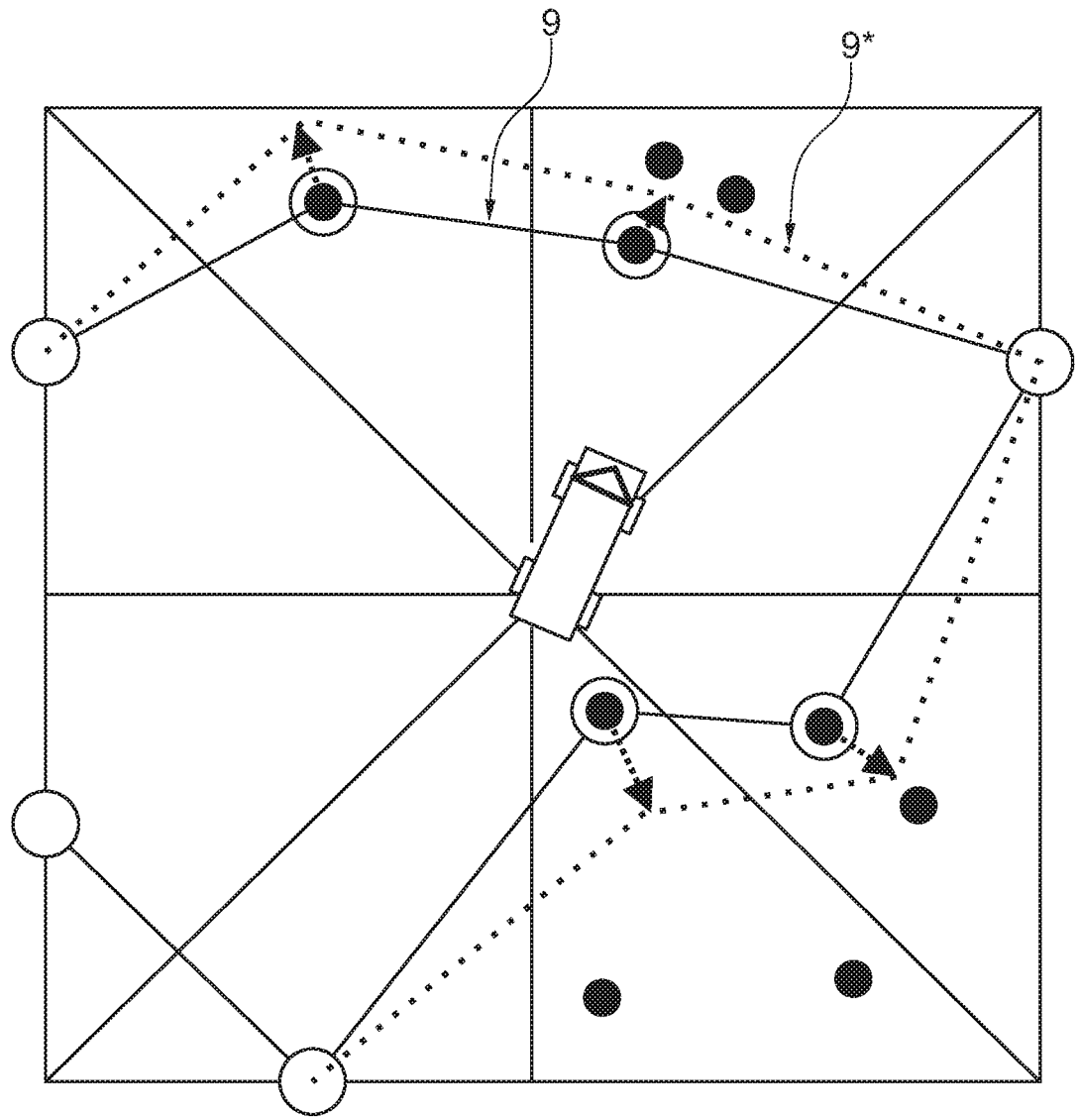
FIG. 3 shows a schematic view of the extending of the polygon or of the map.

The polygon 9 is then extended. For this purpose, only the actually detected corner points 7, 8 in the respective circle segment 4 are moved by a predetermined extent to the outside in a radial direction, as indicated by the dashed arrows in FIG. 3. The result is thus a new profile of the polygon 9*.

The sequence described is repeated approximately every 50 ms since this corresponds approximately to the time for the 360° sensor recording.

The corner points 7 or unconcealed and included objects obtained in this manner are buffered in a FIFO queue and are taken into account, as detections, in the determination of the polygon in addition to the spontaneous measurements of the radar sensor 6, with the result that the probability of positive detections and their consideration increases.

This can be carried out, for example, by increasing or reducing the probabilities of the occupancy of the circle segments using an inverse sensor model and so-called "occupancy grid mapping".

Figure 4:
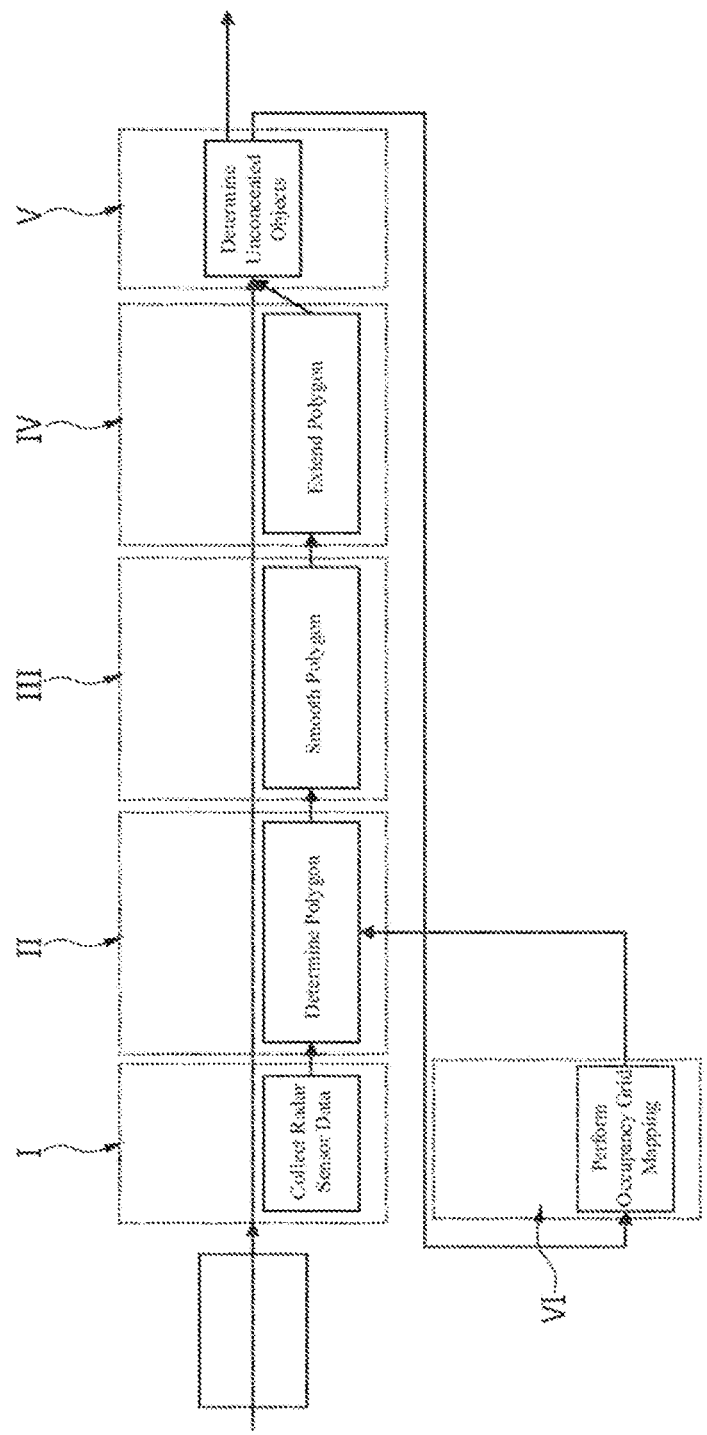
FIG. 4 shows a schematic block diagram of the mapping.

In principle, the method according to the disclosure therefore functions in five to six steps, as described below using FIG. 4.

In the first step I, all radar sensor data are collected according to the FIFO principle of a pass and are divided into the circle segments etc.

In the second step II, as described above, the polygon 9 having the corner points 7 is determined, wherein data from the occupancy grid mapping in step VI can also be included.

The polygon 9 obtained in this manner is smoothed in step III and is then extended in step IV (both as stated above).

The result is therefore a polygon 9* or radar sensor data which comprise only unconcealed objects 7 and can be processed further.

The data relating to the objects 7 which are obtained in this manner can be used for the occupancy grid mapping in the optional step VI.

The invention claimed is:

1. A system, comprising:
    a radar sensor configured to detect a plurality of objects around a vehicle; and
    a controller configured to map an environment around the vehicle based on a polygon having sides connecting respective pairs of objects among the plurality of objects;
    wherein the vehicle is located within an interior of the polygon.

2. The system of claim 1, the radar sensor further configured to detect objects in substantially equally spaced segments around the vehicle, each object being one of an unconcealed object closest to the vehicle in the respective segment or a corner at a detection distance.

3. The system of claim 1, the controller further configured to smooth the polygon by removing one or more corner points between two other corner points having a distance therebetween below a distance threshold.

4. The system of claim 1, the controller further configured to extend one or more corner points of the polygon by a predetermined distance in an outwardly radial direction.

5. The system of claim 1, the controller further configured to determine the polygon based on at least one detected stationary or unconcealed object that is closer to the vehicle at a current time than another previously detected stationary or unconcealed object.

6. A method, comprising:
    detecting, by a radar sensor, a plurality of objects around a vehicle; and
    mapping an environment around the vehicle based on a polygon having sides connecting respective pairs of objects among the plurality of objects;
    wherein the vehicle is located within an interior of the polygon.

7. The method of claim 6, further comprising detecting objects in substantially equally spaced segments around the vehicle, each object being one of an unconcealed object closest to the vehicle in the respective segment or a corner at a detection distance.

8. The method of claim 6, further comprising smoothing the polygon by removing one or more corner points between two other corner points having a distance therebetween below a distance threshold.

9. The method of claim 6, further comprising extending one or more corner points of the polygon by a predetermined distance in an outwardly radial direction.

10. The method of claim 6, further comprising determining the polygon based on at least one detected stationary or unconcealed object that is closer to the vehicle at a current time than another previously detected stationary or unconcealed object.

\* \* \* \* \*